US011825177B2

(12) United States Patent
Lewis et al.

(10) Patent No.: US 11,825,177 B2
(45) Date of Patent: *Nov. 21, 2023

(54) METHODS, SYSTEMS, AND MEDIA FOR PRESENTING INTERACTIVE ELEMENTS WITHIN VIDEO CONTENT

(71) Applicant: GOOGLE LLC, Mountain View, CA (US)

(72) Inventors: Justin Lewis, Mountain View, CA (US); Ruxandra Georgiana Davies, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,480

(22) Filed: Jul. 15, 2021

(65) Prior Publication Data

US 2021/0345017 A1    Nov. 4, 2021

Related U.S. Application Data

(63) Continuation of application No. 16/510,363, filed on Jul. 12, 2019, now Pat. No. 11,070,894, which is a (Continued)

(51) Int. Cl.
*H04N 21/8545* (2011.01)
*G06F 16/74* (2019.01)
(Continued)

(52) U.S. Cl.
CPC ....... *H04N 21/8545* (2013.01); *G06F 16/748* (2019.01); *G06Q 30/02* (2013.01);
(Continued)

(58) Field of Classification Search
CPC .......... G06F 2203/04802; G06F 3/013; G06F 3/04815; G06F 3/04842; G06Q 30/02;
(Continued)

(56) References Cited

U.S. PATENT DOCUMENTS 10,356,493 B2   7/2019  Lewis et al.
11,070,894 B2   7/2021  Lewis et al.
(Continued)

FOREIGN PATENT DOCUMENTS

CN   101447056 A   6/2009
CN   104718007 A   6/2015
(Continued)

OTHER PUBLICATIONS

Final Office Action on U.S. Appl. No. 14/979,347 dated Mar. 10, 2017 (9 pages).
(Continued)

*Primary Examiner* — Olugbenga O Idowu
(74) *Attorney, Agent, or Firm* — MARSHALL, GERSTEIN & BORUN LLP

(57) ABSTRACT

Methods, systems, and media for presenting interactive elements within video content are provided. In some embodiments, the method comprises: causing immersive video content to be presented on a user device, wherein the immersive video content includes at least a first view and a second view, and wherein the first view includes a first interactive element to be presented within the first view and the second view includes a second interactive element to be presented within the second view; receiving an indication that the first view of the immersive video content is to be presented; in response to receiving the indication, causing the first view of the immersive video content to be presented on the user device; determining that the first interactive element has been presented within the first view of the immersive video content; in response to determining that the first interactive element has been presented, identifying a content creator associated with the first interactive element; and assigning attribution information that indicates the pre-
(Continued)

sentation of the first interactive element to the content creator associated with the first interactive element.

18 Claims, 5 Drawing Sheets

Related U.S. Application Data continuation of application No. 14/979,347, filed on Dec. 22, 2015, now Pat. No. 10,356,493.

(51) Int. Cl.
  *H04N 21/4782* (2011.01)
  *H04N 21/81* (2011.01)
  *H04N 21/858* (2011.01)
  *G06Q 30/02* (2023.01)
  *G06Q 30/0251* (2023.01)

(52) U.S. Cl.
  CPC ....... *H04N 21/4782* (2013.01); *H04N 21/812* (2013.01); *H04N 21/8583* (2013.01); *G06Q 30/0251* (2013.01)

(58) Field of Classification Search
  CPC ..... G06T 15/005; G06T 15/20; G06T 19/003; G06T 19/20; G06T 2219/2016
  See application file for complete search history.

(56) References Cited

U.S. PATENT DOCUMENTS

| | | | |
|---|---|---|---|
| 2003/0028873 A1 | 2/2003 | Lemmons | |
| 2007/0250901 A1* | 10/2007 | McIntire | G11B 27/34 348/E7.071 |
| 2008/0033814 A1 | 2/2008 | Carignano | |
| 2008/0126206 A1 | 5/2008 | Jarrell | |
| 2010/0121676 A1 | 5/2010 | Jackson | |
| 2010/0128112 A1 | 5/2010 | Marti et al. | |
| 2013/0054319 A1 | 2/2013 | Woods | |
| 2015/0128014 A1 | 5/2015 | Monroe | |
| 2016/0098860 A1* | 4/2016 | Basra | H04L 67/131 345/633 |
| 2017/0085964 A1* | 3/2017 | Chen | H04N 21/8583 |

FOREIGN PATENT DOCUMENTS

| | | |
|---|---|---|
| CN | 104956299 A | 9/2015 |
| CN | 105027101 A | 11/2015 |
| CN | 106164835 A | 11/2016 |
| KR | 20140031457 A | 3/2014 |
| WO | WO-01/061539 A2 | 8/2001 |

OTHER PUBLICATIONS

Final Office Action on U.S. Appl. No. 14/979,347 dated Sep. 17, 2018 (10 pages).
International Preliminary Report on Patentability on Appln. Serial No. PCT/US2016/065553 dated Jul. 5, 2018 (8 pages).
International Search Report and Written Opinion dated Feb. 13, 2017 in International Patent Application No. PCT/US2016/065553.
International Search Report and Written Opinion on Appln. Serial No. PCT/US2016/065553 dated Feb. 13, 2017 (13 pages).
Niamut et al, "Live Event Experiences—Interactive UHDTV On Mobile Devices," In the Proceedings of the IBC Conference, Amsterdam, NL, dated Sep. 2014 (8 pages).
Niamut et al., "Live Event Experiences—Interactive UHDTV on Mobile Devices", In the Proceedings of the IBC Conference, Amsterdam, NL, Sep. 2014, pp. 1-8.
Non-Final Office Action on U.S. Appl. No. 14/979,347 dated Aug. 10, 2017 (10 pages).
Non-Final Office Action on U.S. Appl. No. 14/979,347 dated Oct. 4, 2016 (8 pages).
Notice of Allowance on U.S. Appl. No. 14/979,347 dated Mar. 6, 2019 (6 pages).
Office Action on EP Appln. Serial No. 16820430.3 dated Oct. 23, 2019 (8 pages).
Office Action on U.S. Appl. No. 14/979,347 dated Apr. 3, 2018 (11 pages).
Office Action on U.S. Appl. No. 14/979,347 dated Nov. 17, 2017 (10 pages).
Written Opinion of the International Searching Authority regarding PCT/US2016/065553 dated Jul. 5, 2018.
Kwiatek et al., Transporting the Viewer Into a 360 heritage story: Panoramic, 2010 16th International Conference on Virtual Systems and Multimedia, Seoul, Korea (South), 234-241 (Dec. 2010).
Office Action and Search Report for Chinese Patent Application No. 202210529321.5, dated Jul. 29, 2023.
Zhang, Virtual Advertising Scene Positioning and Billboard Model Base Design, Journal of China Metrology College (Jul. 2007).
Zhong, Development of 3D Virtual Campus Roaming System Based on Unity, China Excellent Master's Degree Thesis Literature Database (Electronic Journal) (Sep. 2015).

* cited by examiner

METHODS, SYSTEMS, AND MEDIA FOR PRESENTING INTERACTIVE ELEMENTS WITHIN VIDEO CONTENT

CROSS-REFERENCE TO RELATED APPLICATION

This application claims the benefit under 35 U.S.C. § 120 as a continuation of U.S. patent application Ser. No. 16/510,363, filed Jul. 12, 2019, which is a continuation of U.S. patent application Ser. No. 14/979,347, filed Dec. 22, 2015, each of which is hereby incorporated by reference in its entirety.

TECHNICAL FIELD

The disclosed subject matter relates to methods, systems, and media for presenting interactive elements within video content.

BACKGROUND

Content creators are increasingly interested in producing and delivering immersive media content. Additionally, advertisers may be interested in creating immersive video advertisements. Furthermore, advertisers may be interested in providing interactive content within such video advertisements to complement the immersive media content. However, it can be difficult to present the interactive content and attribute the presentation of the interactive content to a creator of the interactive content.

Accordingly, it is desirable to provide methods, systems, and media for presenting interactive elements within video content.

SUMMARY

Methods, systems, and media for presenting interactive elements within video content are provided. In accordance with some embodiments of the disclosed subject matter, methods for presenting interactive elements within video content are provided, the methods comprising: causing immersive video content to be presented on a user device, wherein the immersive video content includes at least a first view and a second view, and wherein the first view includes a first interactive element to be presented within the first view and the second view includes a second interactive element to be presented within the second view; receiving an indication that the first view of the immersive video content is to be presented; in response to receiving the indication, causing the first view of the immersive video content to be presented on the user device; determining that the first interactive element has been presented within the first view of the immersive video content; in response to determining that the first interactive element has been presented, identifying a content creator associated with the first interactive element; and assigning attribution information that indicates the presentation of the first interactive element to the content creator associated with the first interactive element.

In accordance with some embodiments of the disclosed subject matter, system for presenting interactive elements within video content are provided, the systems comprising: a hardware processor that is programmed to: cause immersive video content to be presented on a user device, wherein the immersive video content includes at least a first view and a second view, and wherein the first view includes a first interactive element to be presented within the first view and the second view includes a second interactive element to be presented within the second view; receive an indication that the first view of the immersive video content is to be presented; in response to receiving the indication, cause the first view of the immersive video content to be presented on the user device; determine that the first interactive element has been presented within the first view of the immersive video content; in response to determining that the first interactive element has been presented, identify a content creator associated with the first interactive element; and assign attribution information that indicates the presentation of the first interactive element to the content creator associated with the first interactive element.

In accordance with some embodiments of the disclosed subject matter, non-transitory computer-readable media containing computer executable instructions that, when executed by a processor, cause the processor to perform a method for presenting interactive elements within video content are provided. The method comprises: causing immersive video content to be presented on a user device, wherein the immersive video content includes at least a first view and a second view, and wherein the first view includes a first interactive element to be presented within the first view and the second view includes a second interactive element to be presented within the second view; receiving an indication that the first view of the immersive video content is to be presented; in response to receiving the indication, causing the first view of the immersive video content to be presented on the user device; determining that the first interactive element has been presented within the first view of the immersive video content; in response to determining that the first interactive element has been presented, identifying a content creator associated with the first interactive element; and assigning attribution information that indicates the presentation of the first interactive element to the content creator associated with the first interactive element.

In accordance with some embodiments of the disclosed subject matter, a system for presenting interactive elements within video content are provided, the system comprising: means for causing immersive video content to be presented on a user device, wherein the immersive video content includes at least a first view and a second view, and wherein the first view includes a first interactive element to be presented within the first view and the second view includes a second interactive element to be presented within the second view; means for receiving an indication that the first view of the immersive video content is to be presented; in response to receiving the indication, means for causing the first view of the immersive video content to be presented on the user device; means for determining that the first interactive element has been presented within the first view of the immersive video content; in response to determining that the first interactive element has been presented, means for identifying a content creator associated with the first interactive element; and means for assigning attribution information that indicates the presentation of the first interactive element to the content creator associated with the first interactive element.

In some embodiments, the means for determining that the first interactive element has been presented further comprises: means for identifying a spatial position associated with the first interactive element; and means for determining whether the first view of the immersive video content includes the spatial position associated with the first interactive element.

In some embodiments, the first interactive element is selectable.

In some embodiments, the system further comprises: means for receiving an indication that the first interactive element has been selected; and means for causing an action associated with the first interactive element to be performed on the user device.

In some embodiments, the action is causing a web page to open.

In some embodiments, the action is causing a user interface for sharing the immersive video content to be presented.

In some embodiments, the attribution information further indicates that the interactive element has been selected.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for presenting interactive elements within video content are provided.

In some embodiments, the mechanisms described herein can cause video content to be presented on a user device. In some embodiments, the video content can include immersive media content, which can be recorded using any suitable numbers and types of cameras. For example, in some embodiments, multiplexed views in various directions can be recorded at the same time by one or more video capture devices, and the resulting video content can be stitched together to allow a user to change a viewpoint of presented video content. In some embodiments, the video content can include a video advertisement.

In some embodiments, the mechanisms described herein can cause one or more interactive elements to be presented within the video content. For example, in some embodiments, the interactive elements can include text, images, icons, animations, hyperlinks, and/or any other suitable content. The interactive elements can be presented at a specified spatial position within the video content (e.g., a specified angular position, specified rectangular coordinates, and/or any other suitable spatial position) and/or within a specified time range (e.g., between two time points of the video content, between two frame numbers of the video content, and/or any other suitable time range). In some embodiments, the interactive elements can be presented when a user has manipulated the video content to show a different viewpoint. For example, in instances where a user indicates that they want to pan in a particular direction (e.g., left, right, up, down, and/or any other suitable direction), the mechanisms can cause the interactive elements to become visible when a viewpoint of the video content corresponds to a spatial position of the interactive element(s).

In some embodiments, the mechanisms described herein can attribute presentation of the interactive element(s) to a content creator associated with the video content and/or with one or more of the interactive elements. For example, in response to determining that the interactive element(s) have become visible and/or have been presented, the mechanisms can store an indication in association with an identifier of the content creator. In some embodiments, attribution of presentation of the interactive element(s) can be used for any suitable purpose. For example, in instances where the interactive element(s) and/or the video content are advertisements, the attribution can be used to charge an advertiser for an impression in response to determining that the interactive elements have been presented.

Figure 1A:
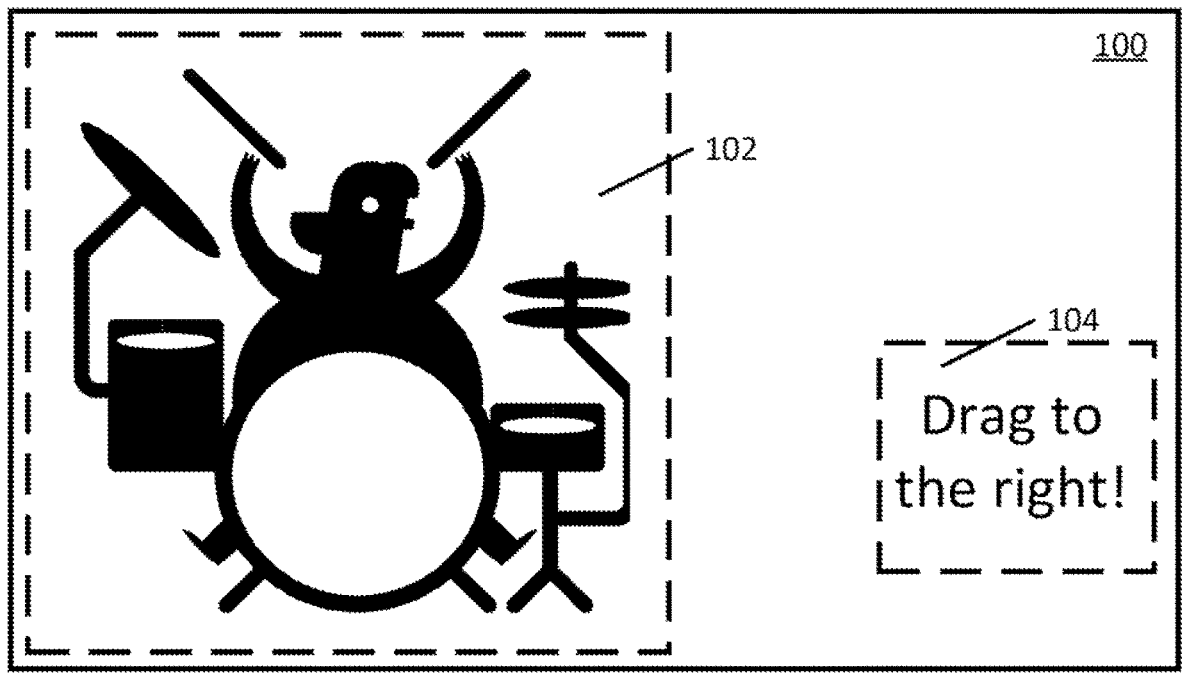
FIGS. 1A and 1B show examples of user interfaces for presenting interactive elements within video content in accordance with some embodiments of the disclosed subject matter.
Figure 1B:
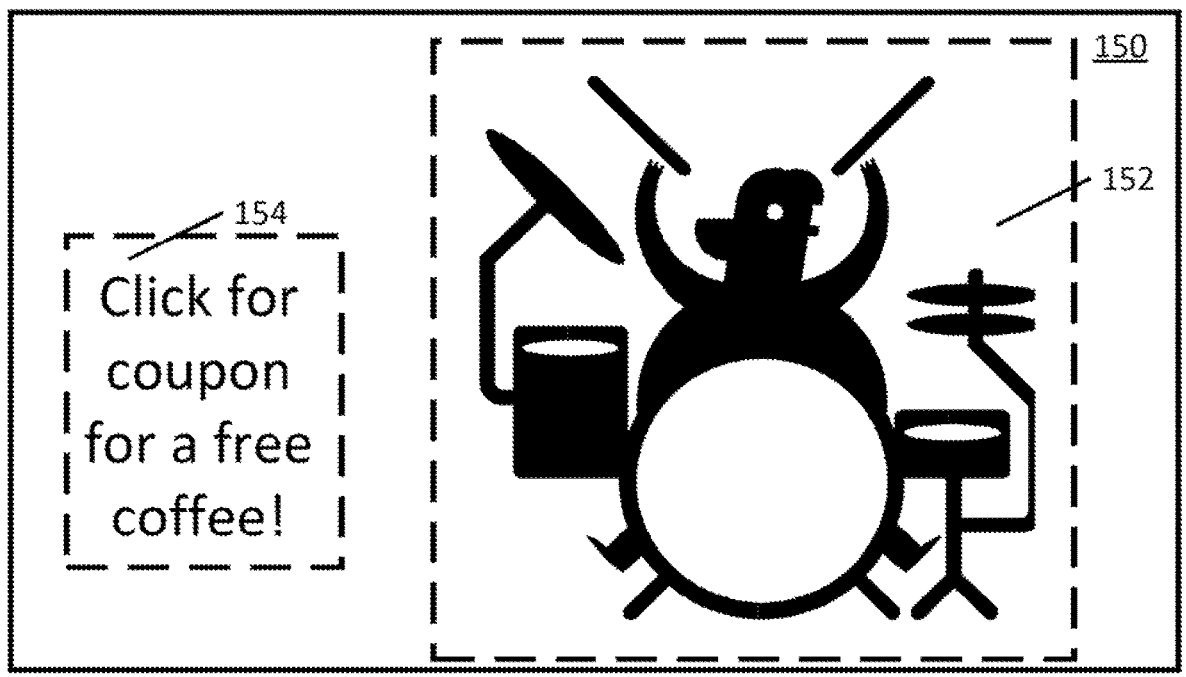

Turning to FIGS. 1A and 1B, examples 100 and 150 of user interfaces for presenting interactive elements within immersive video content are shown in accordance with some embodiments of the disclosed subject matter. In some embodiments, user interfaces 100 and 150 can include two different views of video content, such as an advertisement. For example, as shown in FIGS. 1A and 1B, user interface 100 can present a first view, and user interface 150 can present a second view, such as a view resulting from panning in any direction (e.g., left, right, up, down, and/or any other suitable direction) or otherwise changing the view in any suitable manner. Note that, in some embodiments, the video content can be immersive media content recorded from any suitable video camera(s), and the video content presented in user interfaces 100 and 150 can be different perspectives of the recorded immersive media content.

As shown in FIG. 1A, user interface 100 can include scene content 102. In some embodiments, scene content 102 can include any suitable video content recorded from any suitable camera(s) located at any suitable positions. In some embodiments, scene content 102 can be presented within a video player window (not shown), which can include any suitable controls (e.g., pause, fast-forward, rewind, volume controls, and/or any other suitable controls) for controlling presentation of the video content.

In some embodiments, user interface 100 can include instructions 104. For example, as shown in FIG. 1A, instructions 104 can provide directions for changing a view of the immersive video content shown in user interface 100. Note that the position of instructions 104 within user interface 100 is shown as an example, and instructions 104 can be presented at any suitable location. In some embodiments, instructions 104 can be omitted.

In some embodiments, a view associated with the video content presented in user interface 100 can be changed via a user input received from a user device presenting user interface 100. For example, in some embodiments, the user input can indicate that the view should be changed to pan in a particular direction (e.g., to the left, to the right, up, down, and/or in any other suitable direction), zoom in or out, and/or changed in any other suitable manner. Any suitable type of user input can be used to indicate a new direction, such as input from a keyboard (e.g., with specific keys indicating directions in which the view is to be changed), input from a touchscreen (e.g., by dragging video content presented on the screen, and/or in any other suitable manner), input from a mouse (e.g., by selecting and dragging video content presented on the screen, and/or in any other suitable manner), input from an accelerometer (e.g., where movement of the entire user device indicates a direction in which the view is to be changed), and/or any other suitable user input. In some embodiments, the view can be changed by presenting video content recorded from a different camera. Additionally or alternatively, in some embodiments, the view can be changed by presenting a portion of the video content recorded from the same video camera but corresponding to a spatial position not presented in scene content 102.

As shown in user interface 150 of FIG. 1B, when the field of view of the video content is changed, scene content 152 can be shifted accordingly. Additionally, in some embodiments, user interface 150 can include an interactive element 154. Interactive element 154 can include any suitable interactive content, such as hyperlinks, images, icons, graphics, animations, additional video content, text, and/or any other suitable content. For example, as described below in connection with FIG. 5, in some embodiments, selection of interactive element 154 can cause an action to be performed, such as navigation to a particular web page, causing video content to be shared (e.g., on a social networking site), and/or any other suitable actions. Furthermore, as described below in connection with FIGS. 4 and 5, an indication that interactive element 154 has been presented can be stored in connection with an identifier of the creator of scene content 102 and 152.

Figure 2:
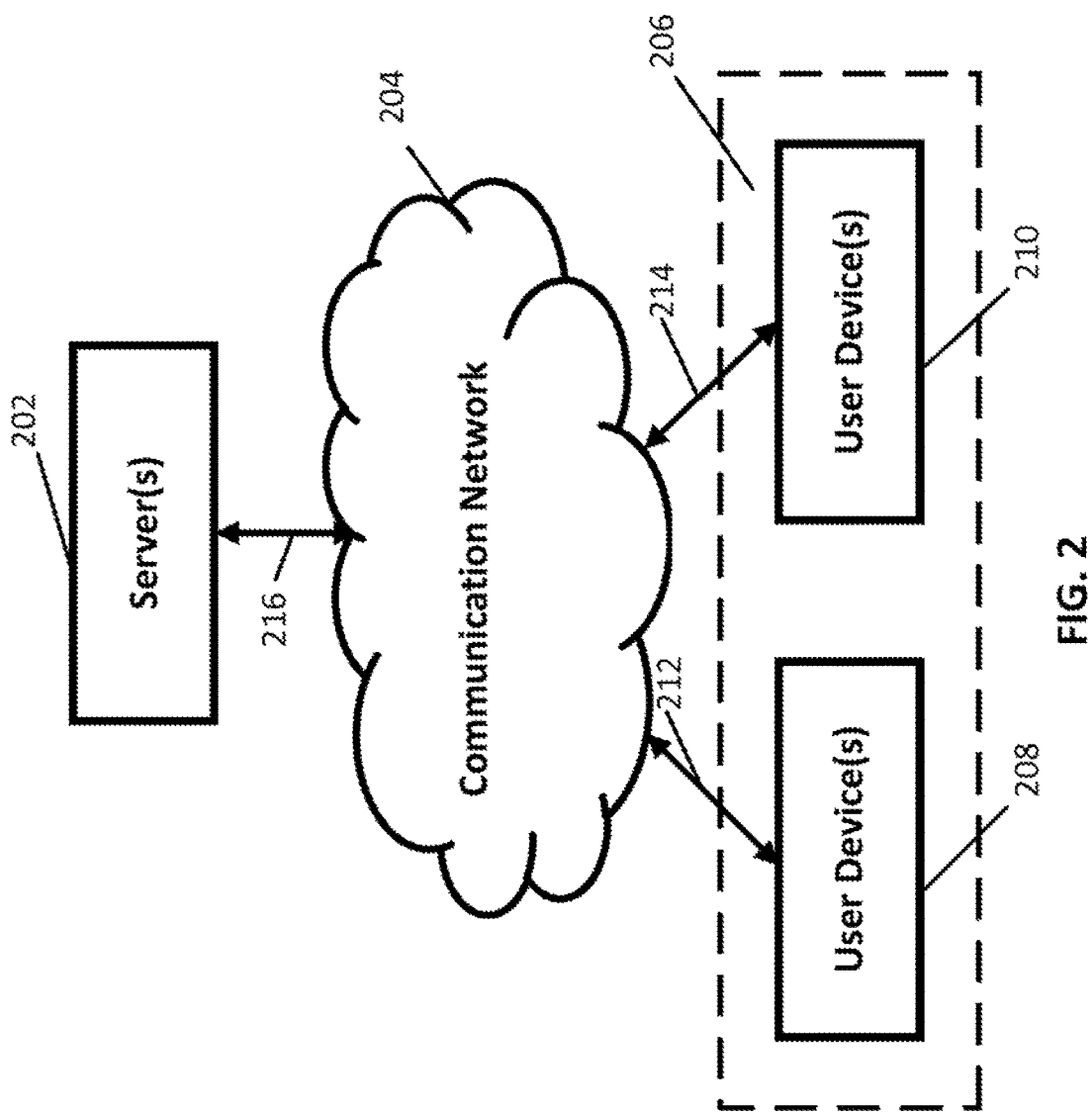
FIG. 2 shows a schematic diagram of an illustrative system suitable for implementation of mechanisms described herein for presenting interactive elements within video content in accordance with some embodiments of the disclosed subject matter.

Turning to FIG. 2, an example 200 of hardware for presenting interactive elements within video content that can be used in accordance with some embodiments of the disclosed subject matter is shown. As illustrated, hardware 200 can include one or more servers such as a data server 202, a communication network 204, and/or one or more user devices 206, such as user devices 208 and 210.

In some embodiments, server(s) 202 can be any suitable server(s) for storing immersive video content, storing indications of interactive elements to be presented within the video content, and/or any other suitable information. In some embodiments, server(s) 202 can use the stored information to cause video content with interactive elements to be presented on user device 206. Additionally or alternatively, in some embodiments, server(s) 202 can determine that an interactive element has been presented on user device 206 and can attribute presentation of the interactive element to a creator of the video content and/or of the interactive element. In some embodiments, server(s) 202 can be omitted.

Communication network 204 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links 214) to server(s) 202. Communications links 212 and/or 214 can be any communications links suitable for communicating data among user devices 206 and server(s) 202 such as network links, dial-up links, wireless links, hard-wired links, any other suitable communications links, or any suitable combination of such links.

In some embodiments, user devices 206 can include one or more computing devices suitable for viewing video content, changing a view of video content, viewing interactive elements, selecting interactive elements, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although server 202 is illustrated as a single device, the functions performed by server 202 can be performed using any suitable number of devices in some embodiments. For example, in some embodiments, the functions performed by server 202 can be performed on a single server. As another example, in some embodiments, multiple devices can be used to implement the functions performed by server 202.

Although two user devices 208 and 210 are shown in FIG. 2, any suitable number of user devices, and/or any suitable types of user devices, can be used in some embodiments.

Figure 3:
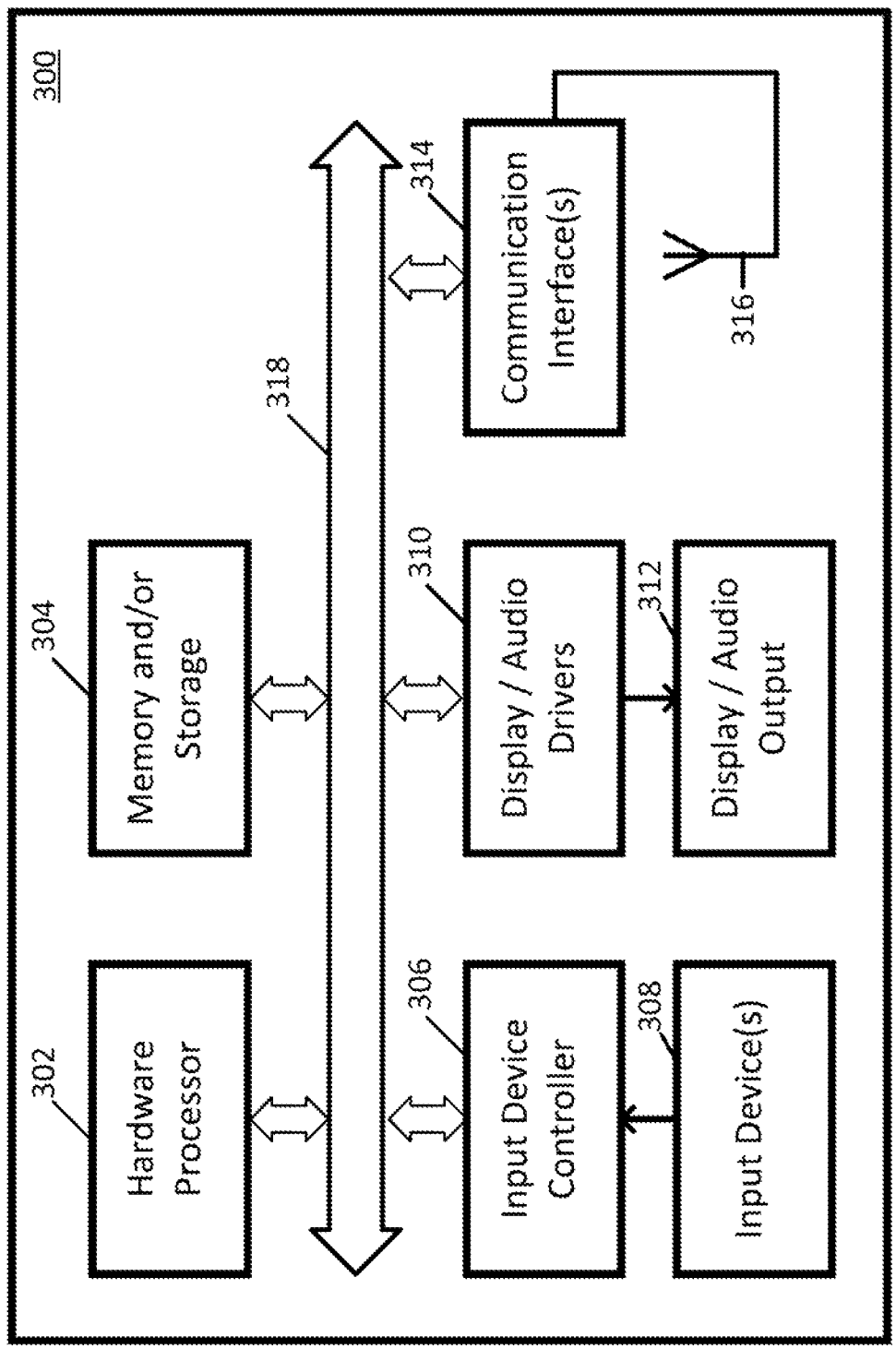
FIG. 3 shows a detailed example of hardware that can be used in a server and/or a user device of FIG. 2 in accordance with some embodiments of the disclosed subject matter.

Server(s) 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server 202). For example, the server program can cause hardware processor 302 to transmit video content to user device 206, determine that an interactive element has been presented on user device 206, attribute presentation of the interactive element to a content creator, and/or perform any other suitable actions. In some embodiments, hardware processor 302 can be controlled by a computer program stored in memory and/or storage 304 of user device 206. For example, the computer program can cause hardware processor 302 to present video content, change a view of the video content, present interactive elements, and/or perform any other suitable actions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
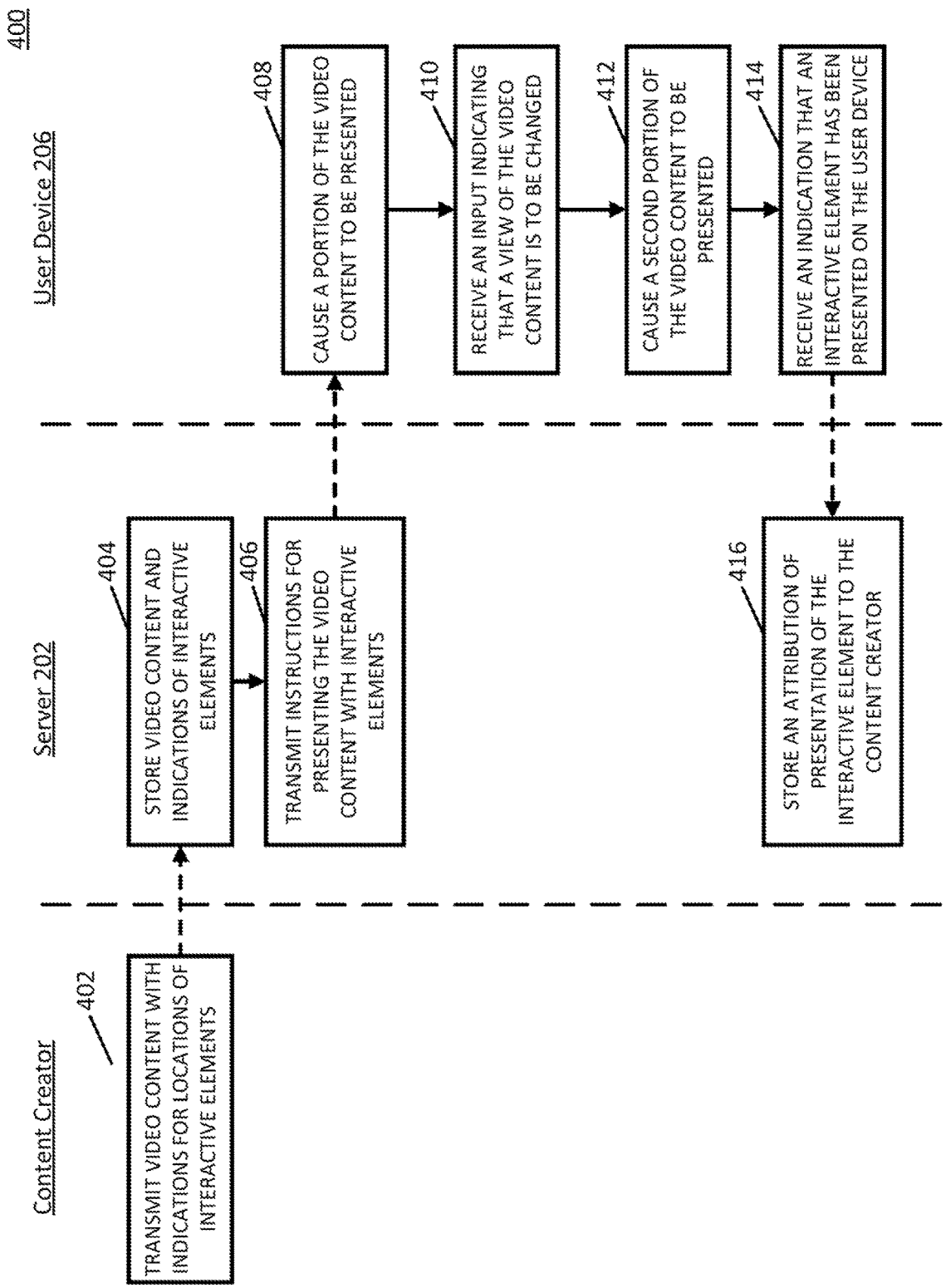
FIG. 4 shows an example of a process for presenting interactive elements within video content in accordance with some embodiments of the disclosed subject matter.

Turning to FIG. 4, an example 400 of an information flow diagram for presenting interactive elements within immersive video content is shown in accordance with some embodiments of the disclosed subject matter. In some embodiments, blocks of information flow diagram 400 can be implemented by a device associated with a content creator, server 202, and/or user device 206.

At 402, the content creator can transmit video content with indications of interactive elements that are to be presented in the video content. As described above, in some embodiments, the video content can be immersive media content recorded from any suitable number of cameras at any suitable location(s). In some such embodiments, the immersive media content can be processed and/or stitched together in any suitable manner. For example, in some embodiments, the immersive media content can include metadata that can specify spatially overlapping portions of the video content, how different user inputs are to cause the portion of the video content that is presented is to change, and/or any other suitable information. Note that, in some embodiments, the video content can be any suitable type of video content, such as advertisements, television programs, movies, live-streaming video content, and/or any other suitable types of video content.

In some embodiments, the indications of interactive elements can include any suitable information. For example, in some embodiments, the information can include images, icons, animations, text, and/or any other suitable content that is to be included in the interactive element. As another example, in some embodiments, the information can include a time point within the video content (e.g., a time elapsed since the beginning of the video content, a frame number, and/or any other suitable time indicator) at which the interactive element is to be presented. As yet another example, in some embodiments, the information can include a spatial position at which the interactive element is to be presented. As a more particular example, in some embodiments, the spatial position can include an (x, y) coordinate, a pixel number, and/or any other suitable indicator of spatial position. As another more particular example, in some embodiments, the spatial position can include an angular position. As a specific example, the angular position can indicate a horizontal and/or a vertical field of view of the video content.

At 404, server 202 can receive the video content and indications of interactive elements. Server 202 can store the video content and indications of interactive elements in any suitable location, such as in memory 304 on server 202.

At 406, server 406 can transmit instructions for presenting the video content and the interactive elements to user device 206. For example, in some embodiments, the instructions can indicate spatial positions of the interactive elements within the video content, one or more times at which the interactive elements are to be presented, and/or any other information related to presentation of the interactive elements. As another example, in some embodiments, the instructions can indicate inputs from user device 206 that are to be used to control a view of the video content. As a more particular example, in some embodiments, the instructions can indicate that particular keystrokes, particular gestures, particular movements of user device 206, and/or any other suitable inputs are to cause a view of currently presented video content to change (e.g., to pan in a particular direction, and/or change in any other suitable manner), as described below in connection with blocks 410 and 412.

At 408, user device 206 can cause a portion of the video content to be presented on user device 206. For example, in instances where the video content is immersive media content, user device 206 can cause a particular portion of the recorded field of view to be presented. The video content can be presented in any suitable manner. For example, in some embodiments, the video content can be presented within a video player window that includes user inputs for controlling presentation of the video content, such as a pause input, a volume control, fast-forward and rewind controls, and/or any other suitable type of controls. As another example, in some embodiments, the video content can be presented with any suitable type of user instructions. As a more particular example, as shown in and described in connection with FIG. 1A above, the video content can be presented with instructions to pan the video content in a particular direction. As another more particular example, the video content can be presented with indications of particular user inputs that will manipulate a field of view (e.g., that arrow keys will pan the view in a particular direction, that moving user device 206 will change the field of view, that selecting and/or dragging the video content with a mouse and/or on a touchscreen will change the field of view, and/or any other suitable indications of user inputs).

At 410, user device 206 can receive an input indicating that a view of the video content is to be changed. In some embodiments, input can be received in any suitable manner. For example, in some embodiments, the input can be received from a keyboard and/or keypad associated with user device 206. As a more particular example, in some embodiments, particular keys (e.g., arrow keys, particular characters, and/or any other suitable keys) can correspond to different changes in view, such as panning in a particular direction (e.g., left, right, up, down, and/or in any other suitable direction). As another example, in some embodiments, the input can be received from a touchscreen associated with user device 206. As a more particular example, in some embodiments, swiping on the touchscreen can indicate that the view is to be changed to show a portion of the video content corresponding to a direction indicated by the swipe. As yet another example, in some embodiments, the input can be received from an accelerometer associated with user device 206. As a more particular example, in some embodiments, the accelerometer can indicate that user device 206 has been moved in a particular direction and/or at a particular velocity, and can determine that the view of the video is to be changed in a direction corresponding to the direction and velocity of the movement of user device 206.

At 412, user device 206 can cause a second portion of the video content to be presented based on the received input. For example, if the received input indicates that a view of the video content is to be changed (e.g., to pan in a particular direction, to tilt, to zoom, to focus on a particular location, and/or changed in any other manner), user device 206 can change the view of the video content. As a more particular example, if the received input indicates that the user wants to pan left (e.g., as shown in and described above in connection with FIGS. 1A and 1B), the second portion of the video content that is presented can include portions of the video content located to the left of the video content presented at block 408. Note that, in some embodiments, the second portion of the video content can be recorded from a different camera than the first portion of the video content.

User device 206 can receive an indication that an interactive element has been presented within the video content by user device 206. The indication can be based on any suitable information. For example, in some embodiments, user device 206 can determine that the interactive element has been presented based on information indicating a spatial position at which the interactive element is to be presented as well as information indicating the spatial positions of the video content that have been presented, as shown in and described below in connection with block 508 of FIG. 5.

At 416, server 202 can attribute presentation of the interactive element to the content creator in response to determining that the interactive element has been presented within the video content. In some embodiments, user device 206 can transmit an indication to server 202 that the interactive element has been presented. Additionally or alternatively, in some embodiments, user device 206 can transmit an indication that an interactive element from a group of interactive elements included in the immersive video content has been presented, and server 202 can identify the interactive element that was presented.

The attribution can be stored in any suitable manner. For example, in some embodiments, server 202 can store an indication that the interactive element was presented. As a more particular example, in some embodiments, server 202 can identify the content creator associated with the presented interactive element (e.g., by querying a database, and/or in any other suitable manner) and can store an indication associated with the identified content creator. In some embodiments, server 202 can store the indication in any suitable location, such as in a database stored in memory 304 of server 202. Note that, in some embodiments, the creator of the video content and the creator of the interactive element can be different. In some such embodiments, presentation of the interactive element can be attributed to either or both content creators. The attribution can be used for any suitable purpose. For example, in some embodiments, the interactive element can be treated as an advertisement, and the attribution can be used to charge the content creator for an impression in response to determining that the interactive element has been presented on user device 206.

Figure 5:
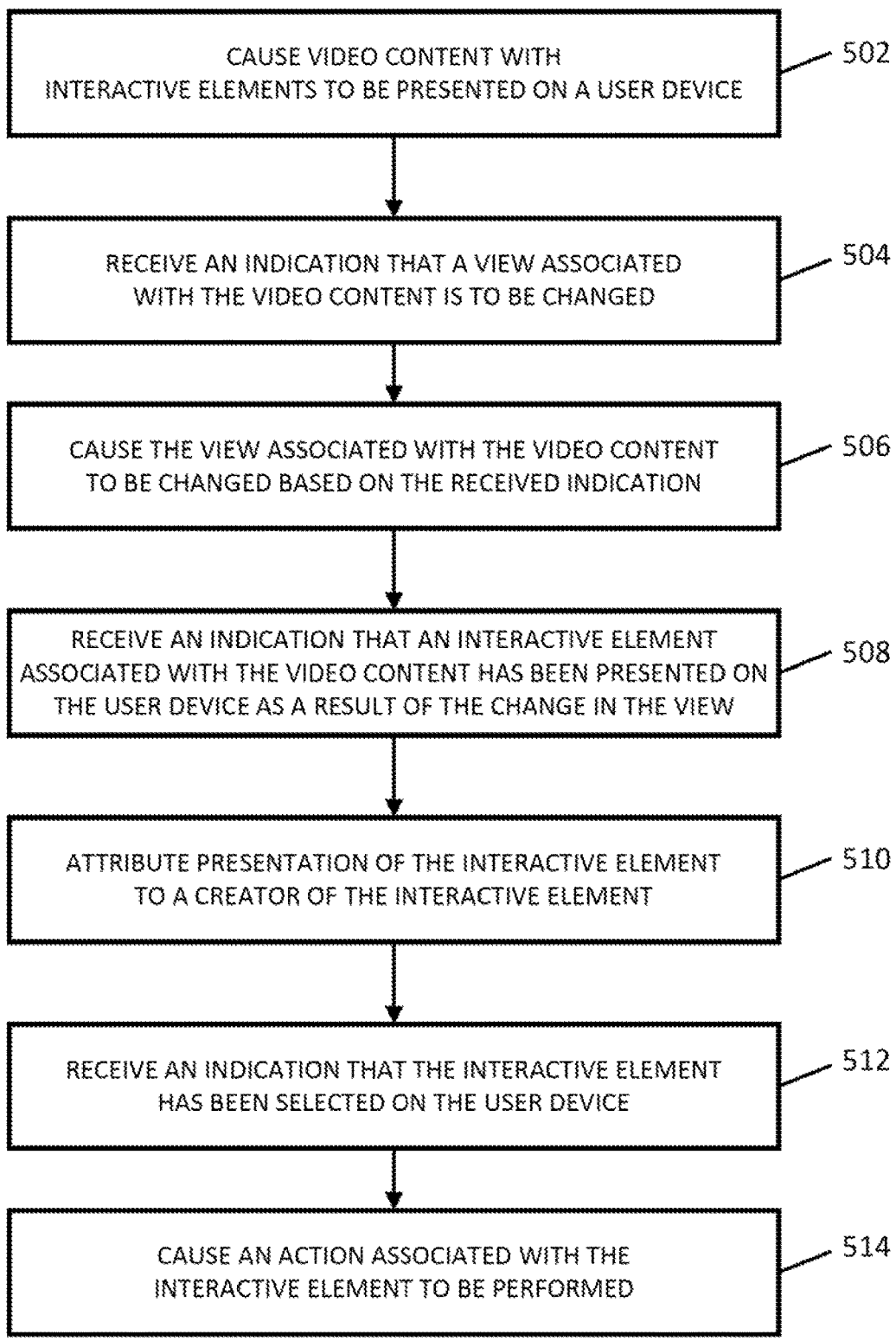
FIG. 5 shows an example of a process for presenting interactive elements within video content in accordance with some embodiments of the disclosed subject matter.

Turning to FIG. 5, an example 500 of a process for presenting interactive elements within video content is shown in accordance with some embodiments of the disclosed subject matter. In some embodiments, blocks of process 500 can be implemented on a user device 206 that is presenting video content.

Process 500 can cause video content to be presented on a user device at 502. As described above in connection with FIGS. 1A, 1B, and 4, the video content can include immersive media content. For example, in some embodiments, the video content can be recorded from multiple cameras, each at a different location, and can be stitched together in any suitable manner. Additionally or alternatively, in some embodiments, the video content can be recorded from a single camera with a wide field of view. As described above in connection with FIG. 1A, instructions for interacting with the video content can additionally be presented (e.g., superimposed on the video content, presented elsewhere on a page that includes a video player, and/or in any suitable manner). For example, as shown in FIG. 1A, the instructions can instruct a user to change a view of the video content in a particular manner, such as to pan in a particular direction, zoom in or out, and/or any other suitable change. As another example, the instructions can indicate particular keys, movements of the user device, motions on a touch screen, movements with a mouse, and/or any other suitable inputs that can cause a view of the video content to change.

Process 500 can receive an indication that a view associated with the video content is to be changed at 504. As described above in connection with block 410 of FIG. 4, the indication can be an input received from a user device presenting the video content, such as a particular keystroke, an input on a touchscreen, a movement of the user device, and/or any other suitable type of input. In some embodiments, the received input can indicate a direction in which the view is to be change, such as a panning direction, a zoom, and/or any other suitable type of change.

Process 500 can cause the view associated with the video content to be changed based on the received indication at 506. For example, if the received indication corresponds to panning the view in a particular direction (e.g., left, right, up, down, and/or any other suitable direction), process 500 can cause the video to be panned in the indicated direction. As another example, if the received indication corresponds to zooming in or out, process 500 can cause the video content to be zoomed accordingly.

Process 500 can cause the view to be changed using any suitable information and any suitable technique(s). For example, in some embodiments, the video content can be associated with metadata which indicates how particular user inputs correspond to different views of the video content. As a more particular example, in some embodiments, the metadata can indicate that particular key inputs, inputs on a touchscreen, and/or movements of the user device correspond to panning the video content in a particular direction. As another more particular example, in some embodiments, the metadata can indicate that when an input to pan in a particular direction is received, a view of the video content is to be changed by a particular angle.

At 508, process 500 can receive an indication that an interactive element within the video content has been presented on the user device as a result of the change in view. Process 500 can make this determination using any suitable information. For example, in some embodiments, process 500 can compare a field of view (e.g., coordinates, an angular position, and/or any other suitable spatial information) of the view currently being presented with a spatial position of the interactive element. As a more particular example, if a spatial position of the current field of view corresponds to an angular position of 60 degrees to 180 degrees, and the interactive element is located at 75 degrees, process 500 can determine that the interactive element has been presented on the user device. Note that, in some embodiments, any suitable coordinate system (e.g., rectangular coordinates, angular and/or spherical coordinates, and/or any other suitable coordinate system) can be used. Additionally, in some embodiments, any suitable number of axes (e.g., one, two, and/or three) can be used.

Process 500 can attribute presentation of the interactive element at 510 to a creator of the video content at 510. For example, as described above in connection with block 416 of FIG. 4, process 500 can store an indication that the interactive element was presented in connection with an identifier of the content creator. In some embodiments, the indication can include any other suitable information, such as a time at which the interactive element was presented, a time point within the immersive video content (e.g., a time elapsed since presentation of the content began, a frame number, and/or any other suitable time point) at which the interactive element was presented, a duration of time the interactive element was presented on the user device before a view of the immersive video content was changed, and/or any other suitable information. In some embodiments, the stored indication can be used for any suitable purpose. For example, in instances where the interactive element is an advertisement, the stored indication can be used to charge the content creator for presentation of the advertisement. Note that, in instances where a creator of the interactive element is different than a creator of the video content, process 500 can attribute presentation of the interactive element to one or both content creators.

In some embodiments, process 500 can determine that presentation of an interactive element is to be attributed to a content creator using any suitable technique or combination of techniques. For example, in some embodiments, process 500 can determine that at least one interactive element from a group of interactive elements included in the immersive content has been presented on the user device (e.g., by comparing spatial positions of the immersive content that have been presented with spatial positions of each interactive element in the group of interactive elements). Process 500 can then identify an entity associated with the interactive element that has been presented. For example, in some embodiments, the entity can be a creator of the interactive element, a creator of the immersive video content, and/or any other suitable entity. In some embodiments, process 500 can identify the entity by querying a database that associates each interactive element in a group of interactive elements included in a particular immersive video content item. Process 500 can then attribute presentation of the interactive element with the identified entity.

Process 500 can receive an indication that the interactive element has been selected on the user device at 512. For example, in some embodiments, process 500 can receive an indication that the interactive element has been touched and/or clicked. Note that, in some embodiments, the interactive element may not be selectable. In some such embodiments, block 512 can be omitted. Note that, in some embodiments, process 500 can determine whether any suitable space surrounding the interactive element has been selected. For example, in some embodiments, an angular range around the interactive element and/or a rectangular space around the interactive element can be defined, and clicking and/or selecting the video content within the specified range or space can be considered to be selection of the interactive element.

Process 500 can cause an action associated with the selected interactive element to be performed at 514. Process 500 can cause any suitable action to be performed. For example, in some embodiments, selection of the interactive element can cause a new web page to be opened, a user interface for sharing the video content to be presented, a user interface for navigating to a different video to be presented, the video content to be skipped over, and/or any other suitable action. In some embodiments, process 500 can store an indication that the interactive element was selected and/or that the associated action was performed in connection with an identifier of the content creator. In some such embodiments, the stored indication can be used for any suitable purpose, for example, to determine an amount the content creator is to be charged for the user's interaction with the interactive element.

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting interactive elements within video content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting interactive elements within video content, the method comprising:
   causing, at a first time point, an initial view of immersive video content to be presented on a user device, wherein the immersive video content includes at least the initial view having a first horizontal field of view at a first angular direction and a first interactive element to be presented on the user device, the first interactive element at a first angular position outside of the first horizontal field of view at the first time point;
   receiving, from the user device at a second time point, an input including a selection on the user device of the initial view of the immersive video content and a gesture, received from the user device, in a direction towards the first angular position;
   in response to receiving the input, causing a viewpoint of the immersive video content to change to a first view having a second horizontal field of view at a second angular direction, different from the first angular direction;
   determining that the first angular position is within the second horizontal field of view of the first view of the immersive video content;
   in response to determining that the first angular position is within the second horizontal field of view of the first view, identifying a content creator associated with the first interactive element; and
   assigning attribution information that indicates the presentation of the first interactive element to the content creator associated with the first interactive element.

2. The method of claim 1, wherein the immersive video content further includes a second view, the second view including a second interactive element to be presented within the second view.

3. A non-transitory computer-readable medium containing computer executable instructions that, when executed by a processor, cause the processor to perform a method for presenting interactive elements within video content, the method comprising:
   causing, at a first time point, an initial view of immersive video content to be presented on a user device, wherein the immersive video content includes at least the initial view, a first view, and a second view, and wherein the first view includes a first interactive element to be presented within the first view and the second view includes a second interactive element to be presented within the second view, and wherein the initial view is different than and does not include a portion of the first view and the second view at the first time point;
   receiving, from the user device at a second time point, an input that causes the first view of the immersive video content to be presented, wherein the input includes a selection on the user device of the initial view of the immersive video content and a gesture, received from the user device, that moves a viewpoint of the immersive video content such that the initial view is no longer visible and the first view is visible;
   in response to receiving the input, causing the first view of the immersive video content to be presented on the user device;
   determining that the first interactive element has been presented within the first view of the immersive video content and that the second interactive element has not been presented within the first view of the immersive video content;
   in response to determining that the first interactive element has been presented, identifying a first content creator associated with the first interactive element; and
   assigning attribution information that indicates the presentation of the first interactive element to the first content creator associated with the first interactive element.

4. The non-transitory computer-readable medium of claim 3, wherein determining that the first interactive element has been presented further comprises:
   identifying a spatial position associated with the first interactive element; and
   determining whether the first view of the immersive video content includes the spatial position associated with the first interactive element.

5. The non-transitory computer-readable medium of claim 3, wherein the first interactive element is selectable.

6. The non-transitory computer-readable medium of claim 5, wherein the method further comprises:
   receiving an indication that the first interactive element has been selected; and
   causing an action associated with the first interactive element to be performed on the user device.

7. The non-transitory computer-readable medium of claim 6, wherein the action is causing a web page to open.

8. The non-transitory computer-readable medium of claim 6, wherein the attribution information also indicates presentation of the first interactive element to the first content creator associated with the first interactive element assigning attribution information and not to a second content creator associated with the second interactive element, responsive to determining that the first interactive element has been presented and determining that the second interactive element has not been presented within the first view of the immersive video content.

9. The non-transitory computer-readable medium of claim 6, wherein the action is causing a user interface for sharing the immersive video content to be presented.

10. A system for presenting interactive elements within video content, the system comprising:
   a hardware processor that is programmed to:
      cause, at a first time point, an initial view of immersive video content to be presented on a user device, wherein the immersive video content includes at least the initial view having a first horizontal field of view at a first angular direction and a first interactive element to be presented on the user device, the first interactive element at a first angular position outside of the first horizontal field of view at the first time point;
      receive, from the user device at a second time point, an input including a selection on the user device of the initial view of the immersive video content and a gesture, received from the user device, in a direction towards the first angular position;

in response to receiving the input, cause a viewpoint of the immersive video content to change to a first view having a second horizontal field of view at a second angular direction, different from the first angular direction;

determine that the first angular position is within the second horizontal field of view of the first view of the immersive video content;

in response to determining that the first angular position is within the second horizontal field of view of the first view, identify a content creator associated with the first interactive element; and assign attribution information that indicates the presentation of the first interactive element to the content creator associated with the first interactive element.

11. The system of claim 10, wherein the hardware processor is further programmed to:

identify a spatial position associated with the first interactive element; and determine whether the first view of the immersive video content includes the spatial position associated with the first interactive element.

12. The system of claim 10, wherein the first interactive element is selectable.

13. The system of claim 12, wherein the hardware processor is further programmed to:

receive an indication that the first interactive element has been selected; and cause an action associated with the first interactive element to be performed on the user device.

14. The system of claim 13, wherein the action is causing a web page to open.

15. The system of claim 13, wherein the action is causing a user interface for sharing the immersive video content to be presented.

16. The system of claim 13, wherein the attribution information further indicates that the first interactive element has been selected.

17. The system of claim 10, wherein the immersive video content further includes a second view, the second view including a second interactive element to be presented within the second view.

18. The system of claim 10, wherein the first interactive element is from a plurality of interactive elements, each element of the plurality of interactive elements is associated with a corresponding set of predetermined coordinates; and wherein the second horizontal field of view comprises the first interactive element, the first interactive element is associated with a first set of predetermined coordinates; and the first interactive element becoming visible in the second horizontal field of view based on the first set of predetermined coordinates.

* * * * *